US011586709B2

(12) United States Patent
Lattin et al.

(10) Patent No.: US 11,586,709 B2
(45) Date of Patent: *Feb. 21, 2023

(54) SECURE PROVISIONING AND MANAGEMENT OF DEVICES

(71) Applicant: INTEGRITY Security Services LLC, Santa Barbara, CA (US)

(72) Inventors: William L. Lattin, Los Altos, CA (US); David R. Sequino, Leesburg, VA (US); Alan T. Meyer, Anaheim Hills, CA (US); Gregory A. Powell, Ladera Ranch, CA (US)

(73) Assignee: INTEGRITY SECURITY SERVICES LLC, Santa Barbara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/400,814

(22) Filed: Aug. 12, 2021

(65) Prior Publication Data

US 2021/0374213 A1 Dec. 2, 2021

Related U.S. Application Data

(63) Continuation of application No. 17/208,302, filed on Mar. 22, 2021, now Pat. No. 11,138,294, which is a
(Continued)

(51) Int. Cl.
*G06F 21/12* (2013.01)
*G06F 21/57* (2013.01)
(Continued)

(52) U.S. Cl.
CPC ............ *G06F 21/12* (2013.01); *G06F 21/572* (2013.01); *H04L 9/007* (2013.01); *H04L 9/0827* (2013.01);
(Continued)

(58) Field of Classification Search
CPC ....... G06F 21/12; G06F 21/572; H04L 9/007; H04L 9/0827; H04L 9/0877; H04L 9/321;
(Continued)

(56) References Cited

U.S. PATENT DOCUMENTS

| 7,707,405 B1 | 4/2010 | Gilman |
| 8,631,247 B2 | 1/2014 | O'Loughlin et al. |

(Continued)

FOREIGN PATENT DOCUMENTS

| JP | 2016518081 A | 6/2016 |
| WO | 2016/093912 A2 | 6/2016 |
| WO | 2018089990 A1 | 5/2018 |

OTHER PUBLICATIONS

Extended European Search Report dated Feb. 25, 2022, EP Application No. 19835051, 8 pages.
(Continued)

*Primary Examiner* — Huan V Doan
(74) *Attorney, Agent, or Firm* — MH2 Technology Law Group LLP

(57) ABSTRACT

Systems, methods and devices are provided for provisioning a computerized device. The system may include a distributor computer that is connected to the computerized device and is operable to receive a first digital asset and transmit it to the computerized device, and a server that is connected to the distributor computer, and that transmits the first digital asset to the distributor computer when a first authorizing condition is met, the first digital asset being configured to cause the computerized device to become partially provisioned, wherein the server transmits a second digital asset to the computerized device, and the computerized device is functional after the second digital asset is transmitted to the computerized device.

30 Claims, 6 Drawing Sheets

Related U.S. Application Data continuation of application No. 17/000,943, filed on Aug. 24, 2020, now Pat. No. 10,956,542, which is a continuation of application No. 16/826,848, filed on Mar. 23, 2020, now Pat. No. 10,762,178, which is a continuation of application No. 16/561,509, filed on Sep. 5, 2019, now Pat. No. 10,599,819, which is a continuation of application No. 15/812,510, filed on Nov. 14, 2017, now Pat. No. 10,503,881.

(60) Provisional application No. 62/487,909, filed on Apr. 20, 2017, provisional application No. 62/421,878, filed on Nov. 14, 2016, provisional application No. 62/421,852, filed on Nov. 14, 2016.

(51) Int. Cl.

| | | |
|---|---|---|
| *H04L 9/08* | (2006.01) | |
| *H04L 9/00* | (2022.01) | |
| *H04W 4/70* | (2018.01) | |
| *H04L 9/32* | (2006.01) | |
| *H04W 4/50* | (2018.01) | |
| *H04W 12/30* | (2021.01) | |
| *H04L 9/40* | (2022.01) | |
| *H04W 12/04* | (2021.01) | |
| *H04W 12/06* | (2021.01) | |
| *H04W 12/75* | (2021.01) | |
| *H04M 15/00* | (2006.01) | |

(52) U.S. Cl.
CPC ............ *H04L 9/0877* (2013.01); *H04L 9/321* (2013.01); *H04L 9/3263* (2013.01); *H04L 63/0823* (2013.01); *H04W 4/50* (2018.02); *H04W 4/70* (2018.02); *H04W 12/04* (2013.01); *H04W 12/06* (2013.01); *H04W 12/35* (2021.01); *H04L 63/0414* (2013.01); *H04L 63/18* (2013.01); *H04M 15/715* (2013.01); *H04W 12/75* (2021.01)

(58) Field of Classification Search
CPC ............... H04L 9/3263; H04L 63/0823; H04L 63/0414; H04L 63/18; H04W 4/50; H04W 4/70; H04W 12/04; H04W 12/06; H04W 12/35; H04W 12/75; H04M 15/715

See application file for complete search history.

(56) References Cited

U.S. PATENT DOCUMENTS

| | | | |
|---|---|---|---|
| 9,183,158 B2 | 11/2015 | O'Loughlin et al. | |
| 9,191,203 B2 | 11/2015 | Rooyakkers et al. | |
| 9,467,297 B2 | 10/2016 | Clish et al. | |
| 9,485,223 B2 | 11/2016 | Daskalopoulos et al. | |
| 9,678,896 B2 | 6/2017 | O'Loughlin et al. | |
| 9,887,975 B1 | 2/2018 | Gifford | |
| 10,003,580 B2 | 6/2018 | Dakalopoulos et al. | |
| 10,027,490 B2 | 7/2018 | Tschache | |
| 10,484,351 B2 | 11/2019 | Romansky et al. | |
| 2009/0191857 A1 | 7/2009 | Horn | |
| 2011/0154018 A1 | 6/2011 | Edstrom | |
| 2011/0191581 A1 | 8/2011 | Shim | |
| 2014/0004827 A1* | 1/2014 | O'Leary | H04W 12/35 455/411 |
| 2014/0082351 A1 | 3/2014 | Chang | |
| 2014/0181504 A1 | 6/2014 | Almahallawy et al. | |
| 2014/0280595 A1 | 9/2014 | Mani et al. | |
| 2014/0337236 A1 | 11/2014 | Wong | |
| 2015/0222621 A1 | 8/2015 | Baum et al. | |
| 2016/0044001 A1 | 2/2016 | Pogorelik et al. | |
| 2016/0078213 A1 | 3/2016 | Rooyakkers et al. | |
| 2016/0112206 A1 | 4/2016 | Cizas | |
| 2016/0150400 A1 | 5/2016 | Cha et al. | |
| 2016/0165433 A1 | 6/2016 | Larignon | |
| 2016/0248746 A1 | 8/2016 | James et al. | |
| 2016/0285840 A1 | 9/2016 | Smith et al. | |
| 2017/0006135 A1 | 1/2017 | Siebel et al. | |
| 2017/0093584 A1 | 3/2017 | Clish et al. | |
| 2017/0222990 A1 | 8/2017 | Romansky et al. | |
| 2017/0295491 A1 | 10/2017 | Gehrmann | |
| 2018/0027410 A1* | 1/2018 | Berard | H04W 4/50 380/270 |
| 2018/0081669 A1 | 3/2018 | Becker | |
| 2018/0137261 A1 | 5/2018 | Lattin et al. | |
| 2018/0159856 A1 | 6/2018 | Gujarathi | |
| 2018/0316511 A1 | 11/2018 | Meyer | |
| 2019/0116048 A1 | 4/2019 | Chen | |

OTHER PUBLICATIONS

William Whyte et al., A Security Credential Management System for V2V Communications, Vehicular Networking Conference (VNC), Dec. 2013, IEEE, pp. 1-8.

Kevin Gay, "Security Credential Management System—Operations and Management" Powerpoint slides, USDOT Plugfest, Nov. 2016, pp. 1-15.

PCT International Search Report and Written Opinion of the International Searching Authority, International Application No. PCT/US2017/061511, dated Jan. 23, 2018, pp. 1-10.

First Action Interview Pilot Program Pre-Interview Communication dated Sep. 14, 2018, U.S. Appl. No. 16/029,559, pp. 1-16.

Xin Wang (Authorized Officer), International Preliminary Report on Patentability dated May 23, 2019, PCT Applicatior No. PCT/US2017/061511, pp. 1-9.

Final Office Action dated Jun. 19, 2019, U.S. Appl. No. 16/029,559, filed Jul. 7, 2018, pp. 1-25.

GSMA, Embedded SIM Specification Remote SIM Provisioning for M2M, 2014, 36 pages.

Lee W. Young, International Search Report and Written Opinion dated Oct. 2, 2019, PCT Application No. PCT/US2019/040064, pp. 1-9.

Harris C. Wang, Notice of Allowance dated Oct. 21, 2019, U.S. Appl. No. 16/029,559, pp. 1-45.

Huan V. Doan, Notice of Allowance dated Nov. 13, 2019, U.S. Appl. No. 16/561,509, pp. 1-61.

Extended European Search Report, EP Application No. 17868918, 9 pages.

Rule 70(2) and 70a(2) Communication, EP Application No. 17868918, 1 page.

Non-Final Office Action dated May 5, 2020, U.S. Appl. No. 16/806,204, 54 pages.

Harris C Wang, Final Office Action dated Oct. 20, 2020, U.S. Appl. No. 16/806,204, 20 pages.

Huan V Doan, Non-Final Office Action dated Aug. 27, 2018, U.S. Appl. No. 15/812,510, 16 pages.

Huan V Doan, Notice of Allowance dated Dec. 26, 2018, U.S. Appl. No. 15/812,510, 13 pages.

Huan V Doan, Notice of Allowance dated May 29, 2019, U.S. Appl. No. 15/812,510, 29 pages.

Huan V Doan, Notice of Allowance dated Nov. 13, 2019, U.S. Appl. No. 16/561,509, 61 pages.

Huan V Doan, Notice of Allowance dated Apr. 27, 2020, U.S. Appl. No. 16/826,848, 47 pages.

Huan V Doan, Notice of Allowance dated Nov. 18, 2020, U.S. Appl. No. 17/000,943, 19 pages.

Harris C. Wang, Notice of Allowance dated Jun. 17, 2021, U.S. Appl. No. 16/806,204, 9 pages.

Harris C. Wang, Corrected Notice of Allowance dated Jul. 22, 2021, U.S. Appl. No. 16/806,204, 7 pages.

Huan V. Doan, Notice of Allowance dated Jun. 10, 2021, U.S. Appl. No. 17/208,302, 24 pages.

Harris C. Wang, Non-Final Office Action dated Mar. 1, 2021, U.S. Appl. No. 16/806,204, 25 pages.

(56) References Cited

OTHER PUBLICATIONS

Simin Baharlou (Authorized Officer), International Preliminary Examination Report dated Jan. 21, 2021, PCT Application No. PCT/US2019/040064, 8 pages.

Makoto Hirai, Japanese Office Action dated Jul. 12, 2022, JP Application No. 2021-500186, 10 pages (including English translation).

Hirai, M., Office Action for Japanese Patent Appl. No. 2021-500186 dated Dec. 21, 2022 (4 pages total with English language translation).

\* cited by examiner

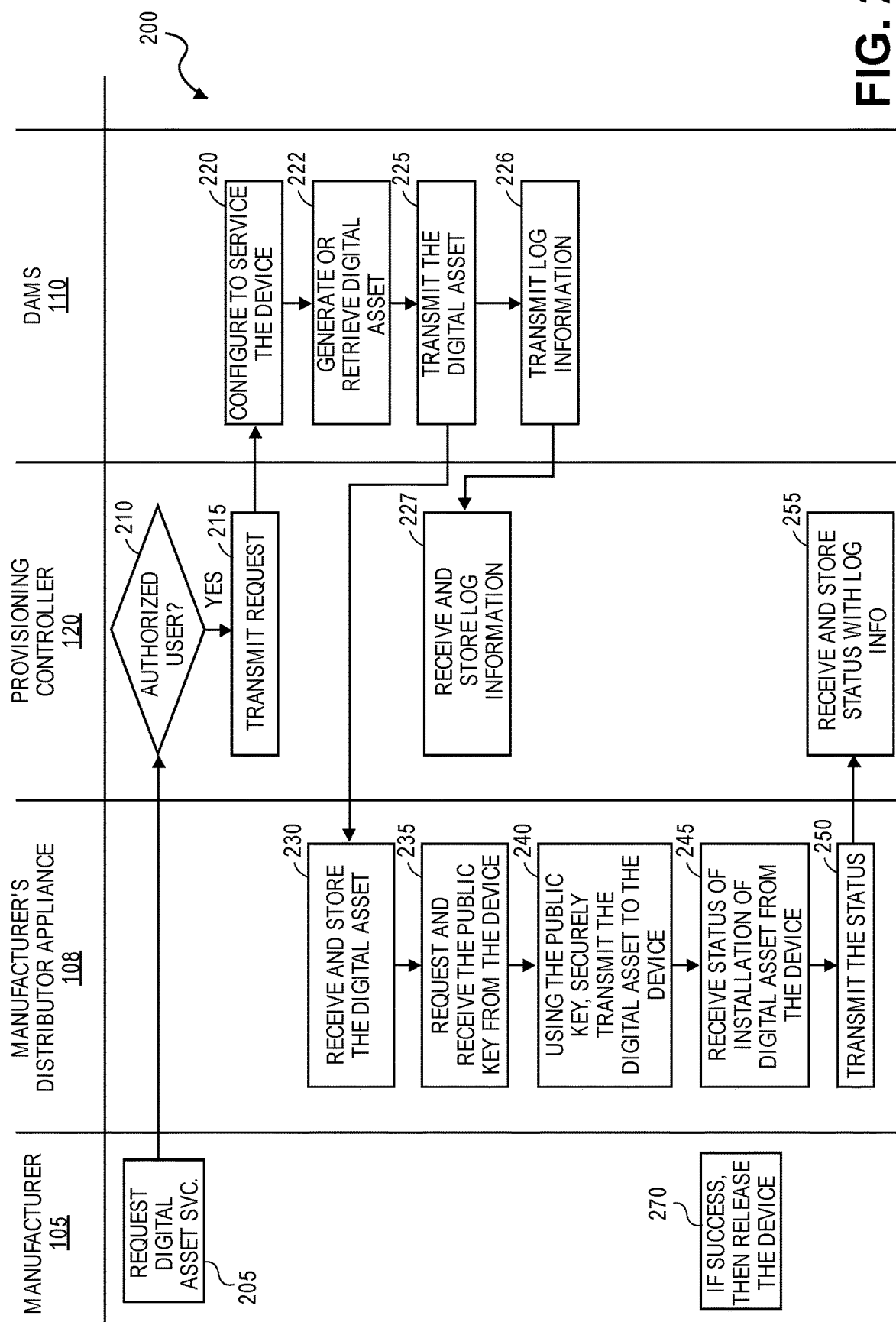

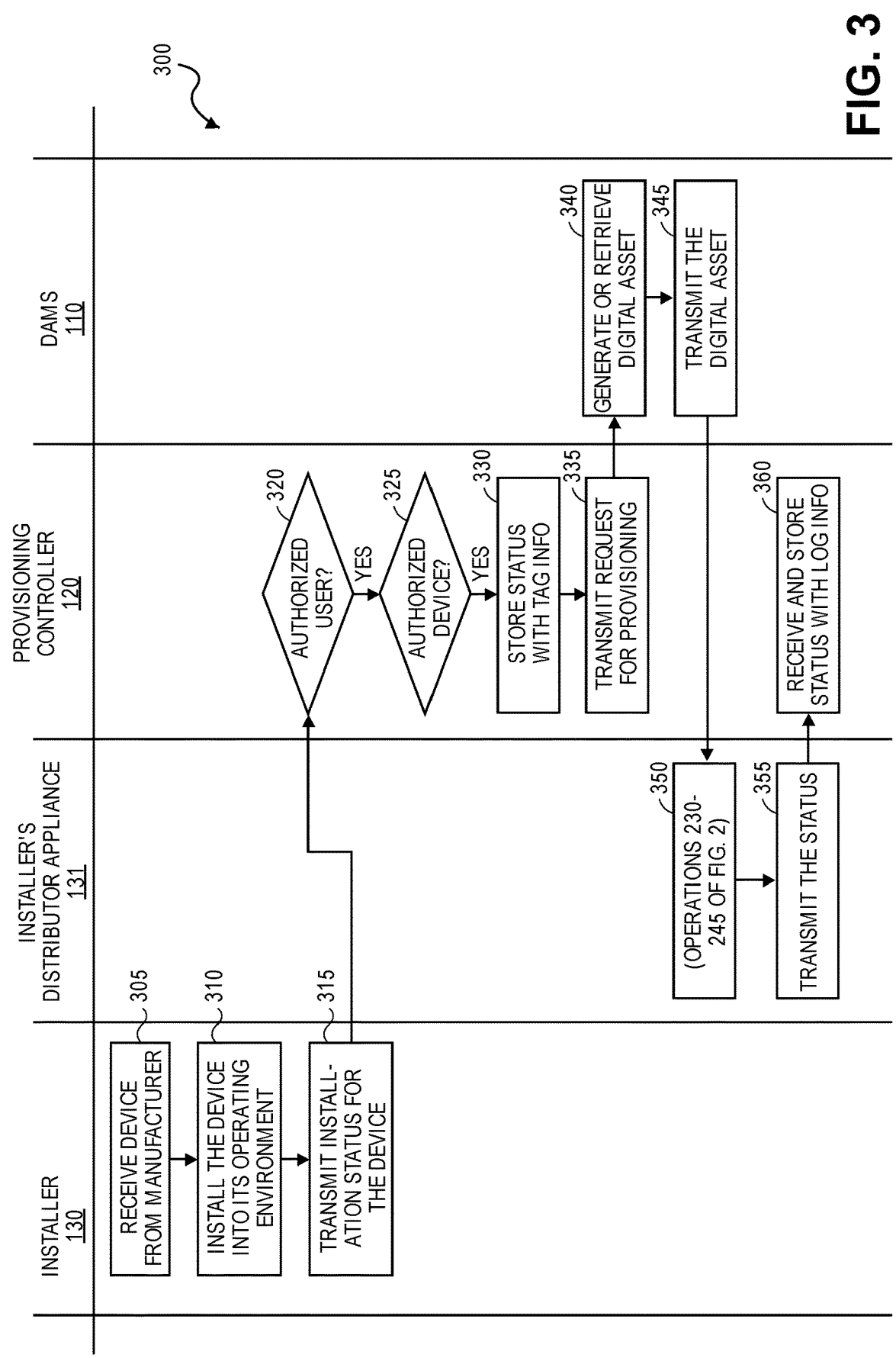

SECURE PROVISIONING AND MANAGEMENT OF DEVICES

CROSS-REFERENCE TO RELATED APPLICATIONS

This application is a Continuation of U.S. application Ser. No. 17/208,302, filed Mar. 22, 2021, which is a Continuation of U.S. application Ser. No. 17/000,943, filed Aug. 24, 2020, which is a Continuation of U.S. application Ser. No. 16/826, 848, filed Mar. 23, 2020, which is a Continuation of U.S. application Ser. No. 16/561,509, filed Sep. 5, 2019, which is a Continuation of U.S. application Ser. No. 15/812,510 filed on Nov. 14, 2017, which claims the benefit of U.S. Provisional Application No. 62/421,878 filed on Nov. 14, 2016; and of U.S. Provisional Application No. 62/421,852 filed on Nov. 14, 2016; and of U.S. Provisional Application No. 62/487,909 filed on Apr. 20, 2017; all of which are hereby incorporated by reference in their entireties.

FIELD OF THE INVENTION

This invention relates to the systems, devices, and methods for the secure provisioning of computerized devices.

BACKGROUND

As computers have become ever more miniaturized and commoditized, manufacturers are producing more and more varied devices that include one or more embedded computer or processor. The computer in a computerized device can control the device's operation; collect, store, and share data; communicate with other computers and other computerized devices; and update its own software, among other things.

The Internet of things (IoT) is the network of computerized physical devices that have embedded processor(s), electronics, software, data, sensors, actuators, and/or network connectivity, which enable these devices to connect and exchange data via digital networks, including the Internet, cellular networks, and other wireless networks. Typically, each "thing" is uniquely identifiable through its embedded computing system, and is able to inter-operate within the existing Internet infrastructure.

"Things", in the IoT sense, can refer to a wide variety of computerized devices, such as consumer appliances, enterprise devices used in business and corporate settings, manufacturing machines, farming equipment, energy-consuming devices in homes and buildings (switches, power outlets, bulbs, televisions, etc.), medical and healthcare devices, infrastructure management devices, robots, drones, and transportation devices and vehicles, among many others.

For example, most, if not all, modern vehicles (e.g., cars, trucks, aircraft, trains, watercraft, and the like) contain several embedded processors or embedded computers in their subsystems, and are computer-controlled in at least some aspects. Similarly, a growing number of modern transportation infrastructure devices (e.g., traffic lights, traffic cameras, traffic sensors, bridge monitors, bridge control systems, and the like) contain at least one, and often many, embedded processors or embedded computer systems, and are computer-controlled in at least some aspects. These computer-controlled elements of the transportation network typically communicate with each other, passing various types of information back and forth, and they may react, respond, change their operation, or otherwise depend upon the information received/sent from/to other vehicles in Vehicle-to-Vehicle (V2V; also known as C2C, Car-to-Car) communications and/or from/to infrastructure elements in Vehicle-to-Infrastructure (V2I, also known as C2I, Car-to-Infrastructure) communications for safe, correct, efficient, and reliable operation.

The computers in computerized devices operate according to their software and/or firmware and data. In order to ensure safe and proper operation, the computerized devices must be properly initialized and updated with the proper software, firmware, executable instructions, digital certificates (e.g., public key certificates), cryptographic keys and the like (hereinafter collectively referred to as "digital assets" or "software") as intended by the manufacturer, so that the IoT consists only of devices that are executing authorized, known-to-be-good software and data. Problems arise, however, when unauthorized persons or organizations (e.g., hackers) replace or change the software in computerized devices. Problems also arise when older software, untested software, unapproved software, and/or software with known bugs is installed in computerized devices.

Accordingly, it is desirable to provide improved systems, methods and techniques for securely provisioning the digital assets in computerized devices, so as to prevent the computerized devices from operating using error-ridden, incorrectly functioning, untested, maliciously altered, or otherwise undesirable software and data.

SUMMARY

Disclosed herein are systems, methods and devices for securely provisioning a computerized device. In various implementations, the system includes a secure distributor computer that is communicatively connected to the computerized device, and that receives a first digital asset and transmits the first digital asset to the computerized device; a digital asset management server that is connected to the secure distributor computer, and that transmits the first digital asset to the secure distributor computer when a first authorizing condition is met, wherein the first digital asset is configured to cause the computerized device to be partially provisioned, wherein the digital asset management server transmits a second digital asset to the computerized device, and wherein the computerized device is functional after the second digital asset is transmitted to the computerized device.

In various implementations, the system may include a distributor computer that is communicatively connected to the computerized device, and that receives a first digital asset and transmits the first digital asset to the computerized device; a server that is connected to the distributor computer, and that transmits the first digital asset to the distributor computer when a first authorizing condition is met, wherein the first digital asset is configured to cause the computerized device to be partially provisioned, wherein the server transmits a second digital asset to the computerized device, and wherein the computerized device is functional after the second digital asset is transmitted to the computerized device.

In various embodiments, the computerized device may be nonfunctional or only partially functional before the first and/or second digital asset(s) is/are loaded into the computerized device, due to the absence of the digital asset. In some cases, the computerized device may be functional, either partially or fully, after the second digital asset is loaded into the computerized device. The digital asset may be one or more of a digital certificate, a cryptographic key, or executable software, among other things.

In some other implementations, the system may be further operable to transmit another (e.g., $3^{rd}$) digital asset (e.g., an executable software image, executable code, or the like) to the first distributor computer or the second distributor computer for transmitting to the computerized device. In yet other implementations, the system may be further operable to create and maintain a log that is associated with the computerized device and that stores information regarding the provisioning activities for the computerized device, and first secure distributor may transmit information regarding provisioning activities related to the computerized device to the system (e.g., the provisioning controller) for storing in the log.

Other embodiments disclosed herein include systems, methods and devices for provisioning one or more computerized devices that include a first secure distributor computer that is communicatively connected to a computerized device; a digital asset management server that is connected to the first secure distributor computer; and a second secure distributor computer that is connected to the digital asset management server. Such systems, methods and devices may perform methods or operations that include generating a first instruction, by a provisioning controller, to instruct a digital asset management server to transmit a first digital asset to a first secure distributor computer; in response to the first instruction, transmitting the first digital asset from the digital asset management server to the first secure distributor computer; transmitting the first digital asset from the first secure distributor computer to the computerized device, wherein the first digital asset is configured to cause the computerized device to become partially provisioned; generating a second instruction, by the provisioning controller, to instruct the digital asset management server to transmit a second digital asset to the second secure distributor computer; in response to the second instruction, transmitting the second digital asset from the digital asset management server to the second secure distributor computer; and transmitting the second digital asset from the second secure distributor computer to the computerized device, wherein the second digital asset is configured to cause the computerized device to become functional.

In various embodiments, the first digital asset and/or the second digital asset may be any of: a digital certificate, a cryptographic key, executable code, or the like. And as mentioned above, various embodiments of the provisioning controller may include logs and logging capabilities and various portals. In addition, various embodiments of the provisioning controller may be operable to authenticate the computerized device before a digital asset is transmitted to the computerized device.

Still other embodiments disclosed herein include additional systems, methods and devices system for securely provisioning one or more computerized devices. In various such embodiments, the system includes a secure distributor computer that is communicatively connected to the computerized device, and that receives a first digital asset and transmits the first digital asset to the computerized device, a digital asset management server that is connected to the first secure distributor computer, and that transmits the first digital asset to the secure distributor computer when a first authorizing condition is met, wherein the first digital asset is configured to cause the computerized device to become partially provisioned, and wherein the digital asset management server transmits a second digital asset to the computerized device, wherein the computerized device is functional after the second digital asset is provisioned to the computerized device.

In some such embodiments, the first digital asset may be one or more of: executable code that is run by the computerized device and a digital certificate, and/or the second digital asset may be one or more of: a digital certificate, a cryptographic key, and executable code. And as mentioned above, various embodiments of the system may include logs and logging capabilities and various portals. In addition various embodiments may be operable to authenticate the computerized device before a digital asset is transmitted to the computerized device.

Yet other embodiments disclosed herein include systems, methods and devices for provisioning one or more computerized devices that include a first secure distributor computer that is communicatively connected to a computerized device; and a second secure distributor computer. Such systems, methods and devices may perform methods or operations that include: transmitting, a first digital asset to a first secure distributor computer; transmitting the first digital asset from the first secure distributor computer to the computerized device, wherein the first digital asset is configured to cause the computerized device to become partially provisioned; transmitting, a second digital asset to a second secure distributor computer; and transmitting the second digital asset from the second secure distributor computer to the computerized device, wherein the second digital asset is configured to cause the computerized device to become functional. The digital assets may be one or more of a digital certificate, a cryptographic key, and executable code that is run by the computerized device, and a digital certificate.

BRIEF DESCRIPTION OF THE DRAWINGS

The accompanying drawings, which are incorporated into and constitute a part of this specification, illustrate implementations of the invention and together with the description, serve to explain the principles of the invention. In the figures:

FIG. 2 is a swim-lane diagram illustrating an example of process for securely provisioning a computerized device, consistent with implementations of the invention;

FIG. 3 is a swim-lane diagram illustrating another example of process for securely provisioning a computerized device, consistent with implementations of the invention;

DETAILED DESCRIPTION

Figure 1:
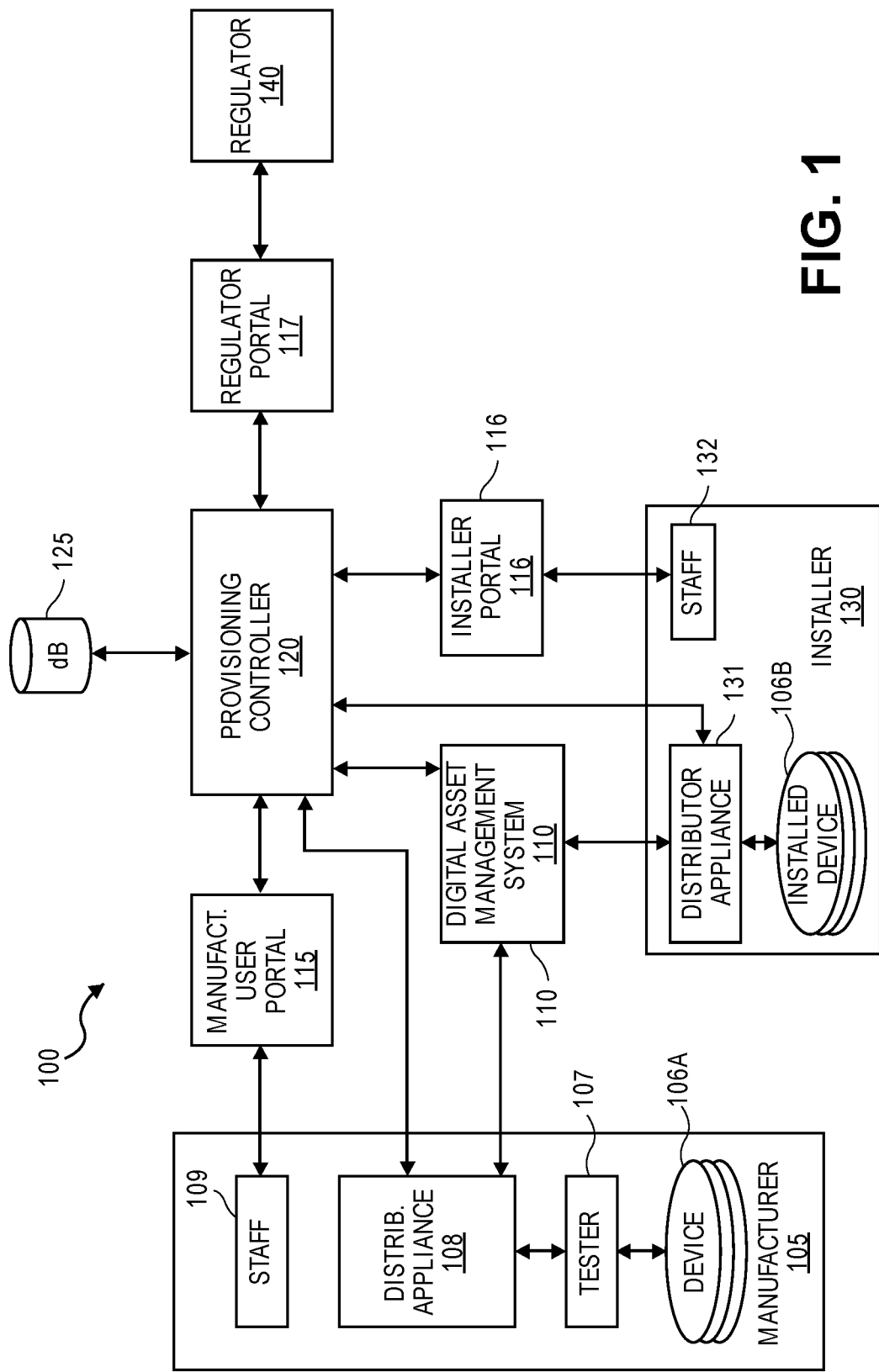
FIG. 1 is a block diagram showing an example of a system for secure provisioning, consistent with implementations of the invention.

Reference will now be made in detail to various implementations of the invention, examples of which are illustrated in the accompanying drawings. Wherever convenient, the same reference numbers will be used throughout the drawings to refer to the same or like parts.

In order to ensure safe and proper operation in the field, embedded devices, for instance, the Electronic Control Unit (ECUs) used in vehicles, need to be properly initialized during manufacturing by provisioning digital assets, such as security assets. Digital assets could include various cryptographic keys, a unique identifier, digital certificates, and software. In most cases, the origin of these digital assets and manufacturing factories are located in different geographical locations, which are conventionally interconnected via insecure Internet communications. It is therefore desirable to create an end-to-end secure channel from the origin of these digital assets to the device, such that the digital assets cannot be accessed or modified by malicious parties or by accident.

There are drawbacks to traditional network security protocols for end-to-end protection, such as TLS/SSL, in that they require either pre-shared keys or certain secret security materials to pre-exist at both communicating parties. This creates a cyclic technical problem in that, in order to provision digital assets, some initial secret materials must pre-exist. This problem includes how to protect the initial secret materials. This problem is especially acute for computerized devices because, to simplify logistics, typically a single version of the initial software is loaded on the computerized device during manufacturing. If this initial software must contain initial security materials, this requires a global secret to exist. As a consequence, compromising the initial security materials will lead to compromise of all digital assets provisioned on all devices, as they all share the same global secret. Systems, methods and devices consistent with the present disclosure address these and other problems of conventional provisioning systems.

Provisioning generally refers to the set of actions taken to prepare a computerized device with appropriate data and software. It may also include the set of actions taken to properly install the device in its operational environment, making it ready for operation. The actions include loading the appropriate digital assets (e.g., operating system, device drivers, middleware, applications, digital certificates, and the like) into a digital storage (e.g., memory) of the device, and appropriately customizing and configuring certain digital assets on the device (if needed), which digital assets may be unique to each particular device. The actions may also include verifying that the computerized device is a legitimate device created by a legitimate device manufacturer, and not a copy or a counterfeit device.

The actions may also include correctly installing the device into its operational environment and testing it to verify that it is operating properly. The ability to securely provision only known-to-be-good devices is complicated by the fact that the devices may be built by one manufacturer and later installed by another into a larger system or device—for example an On Board Unit (OBU) built by a component manufacturer may be installed into a car built by the car manufacturer. An improperly installed device may function incorrectly.

Various implementations consistent with the present invention provide secure provisioning of computerized devices, including IoT devices. Such implementations serve to prevent or inhibit the malicious, negligent, or mistaken tampering, altering, updating, or releasing of digital assets that are used by the computerized devices, and prevent or inhibit the improper installation of the computerized devices and their software.

Various implementations consistent with the present invention may also produce audit logs, records, reports, and the like, of the secure provisioning process, which may be used to analyze and resolve later-discovered problems.

Various implementations consistent with the present invention may also provide a secure provisioning and management platform, which may be provided as a service to device and system manufacturers.

FIG. 1 is a block diagram showing an example of a system 100 for secure provisioning of computerized devices, consistent with implementations of the invention. As shown in the example of FIG. 1, the system 100 includes a provisioning controller 120. The provisioning controller 120 may be implemented as a server computer (e.g., having at least one processor and associated memory) with an embedded hardware security module (HSM) that securely generates and stores digital security assets and that securely performs a variety of cryptographic and sensitive computations. The HSM protects digital security assets, such as cryptographic keys, and other sensitive data from possible access by an attacker. In various implementations, the provisioning controller 120 functions to authenticate and securely communicate with users of the system 100; securely communicate with and manage one or more distributor appliances 108, 131; securely communicate with and direct the operations of a digital asset management system (DAMS) 110; create and store provisioning records; create, store and distribute provisioning records; create, store and distribute audit logs; create and distribute certificates to cryptographically bind together the DAMS 110 and distributor appliance 108, 131 elements; revoke users and managed devices as needed if they cease to be trusted; and create and distribute secure encrypted backups of critical keys and data for offsite storage for business continuity and disaster recovery.

As shown in the example of FIG. 1, the provisioning controller 120 is communicatively connected to a database 125, which may store data, information, and digital assets related to securely provisioning the devices 106*a*, 106*b*, (which may be collectively referred to as 106).

The provisioning controller 120 is also securely communicatively connected to a manufacturer's user portal 115, which may be implemented, e.g., as a server or as an interface to the provisioning controller 120. In various implementations, the staff 109 of a device manufacturer 105 may use the manufacturer's user portal 115 to interface with the provisioning controller 120 (and thus the DAMS 110) and manage their device provisioning activities. In various implementations, the manufacturer's user portal 115 may collect identifying information from a staff user 109, such as username, password, two-factor identification data, a facial recognition image, a fingerprint, etc., and provide the identifying information to the provisioning controller 120. The provisioning controller 120 may authenticate the staff 109 before allowing the staff 109 to access the secure provisioning system 100. For example, the provisioning controller 120 may look up identifying information that is associated with the staff user 109 and that was previously verified and stored in its database 125, and compare the stored identifying information to the identifying information collected by the manufacturer's user portal 115. Alternatively, the provisioning controller 120 or the DAMS user portal 115 may be integrated with a user's enterprise identification and authentication system, which will determine if the staff 109 are authorized to use the system 100. In various implementations, the provisioning controller 120 or the DAMS user portal 115 may apply roles to the successfully authenticated staff 109 to constrain their actions within the system 100. In some implementations, the provisioning controller 120 may allow access only if the two sets of identifying information match.

Similarly, the provisioning controller 120 is also communicatively connected to an installer user portal 116, which may be implemented, e.g., as a server or as an interface to the provisioning controller 120. In various implementations, the staff 132 of a device installer may use the installer user portal 116 to interface with the provisioning controller 120 (and thus the DAMS 110) and manage their device installation and provisioning activities. The provisioning controller 120 may authenticate the staff 132 before allowing the staff 132 and assign them roles before allowing the staff 132 to access the secure provisioning system 100 and perform authorized functions on the system.

Also similarly, the provisioning controller 120 is also communicatively connected to a regulator portal 117, which may be implemented, e.g., as a server or as an interface to the provisioning controller 120. In various implementations, a regulator 140, once authenticated by the provisioning controller 120, may use the regulator portal 117 to interface with the provisioning controller 120 and manage the review and approval of manufacturers 104, installers 130, devices 106, and/or the software/digital assets that are installed in the devices 106. The provisioning controller 120 may authenticate the regulator 140 before allowing the regulator 140 to access the secure provisioning system 100. In some implementations of the system 100, the regulator 140 and the regulator portal 117 are optional.

The provisioning controller 120 is further communicatively connected to the DAMS 110. In various implementations, the DAMS 110 may be implemented as a server, a device, or a system of secure appliances and/or servers. The DAMS 110 securely retrieves the public keys from the end entity devices to be provisioned, via the distributer appliances 108, 131, or other secure and authenticated connection, and securely supplies the digital certificates and related data that are installed in the devices 106. In addition, the DAMS 110 securely receives, via the distributor appliances 108, 131, status information about the provisioning, installation, functionality, etc. of the computerized devices 106 from the manufacturer 105 and the installer 130. In addition, the DAMS 110 may perform this provisioning at a single site or at multiple sites as shown in FIG. 1. As explained in more detail with respect to FIG. 4, the DAMS 110 may include the following main elements: a root certificate authority (CA), a policy generator, a CRL generator, a misbehavior authority, an intermediate CA, an enrollment CA, a linkage authority, a pseudonym CA, and a registration authority.

The DAMS 110 adds new functionality and improves upon the components and functionality described in the paper "A Secure Credential Management System for V2V Communications" by William Whyte et al., 2013 IEEE Vehicular Networking Conference, December 2013. In various implementations, the DAMS 110 includes multi-stage programming and flexible management, (e.g., allowing the inclusion of regulators 140). Various implementations of the DAMS 110 also enable the ability to allow a single DAMS 110 to provide different levels of provisioning to different subscribers. Various implementations of the DAMS 110 also enable the ability to allow subscribers to assign different digital certificate usages during a time period (e.g., per week) as well as different certificate loads (such as one week, instead of three years as in conventional systems). Various implementations of the DAMS 110 may also provide subscriber-specific URLs so that a specific manufacturer's computerized device 106 (e.g., an OEM's vehicles) can stay within the manufacturer's sphere (e.g., their URL shows their name).

As shown, the provisioning controller 120 is also communicatively connected to the distributor appliances 108, 131. In various implementations, a distributor appliance 108, 131 may be implemented as a standalone secure appliance installed at the company premises (as shown) or as a web or cloud service, among other things. In various implementations, the distributor appliance 108, 131 is realized as a trusted endpoint device that securely transmits and receives digital assets and other information to and from the DAMS 110 and the provisioning controller 120, preferably via dedicated, non-Internet communications channels. As shown, a distributor appliance 108, 131 also connects, either directly or indirectly, with a device 106*a*, 106*b*, in order to download digital assets to, and receive data from, the device 106*a*, 106*b*. In various implementations, the distributor appliance 108, 131 can be implemented as box including a server computer (e.g., having at least one processor and associated memory) with a hardware security module, a hardened operating system (OS), an internal firewall and an internal host intrusion detection/prevention system. The distributor appliance may be specifically designed to operate in untrusted environments yet still provide trusted and reliable operation. The distributor appliance has a secure communications channel(s) between itself and the secure provisioning controller 120 and the DAMS 110. This channel is used to control the distributor appliance and to send and retrieve provisioning-related data and log information. The distributor appliance also may have a secure communications channel to the tester 107 used to program or provision the device 106. This channel protects provisioning data and log data from being revealed or modified on the manufacturing location's communication network. The distributor appliance 108 may also establish a secure communications channel directly with the device 106 to be programmed so that the provisioning data cannot be compromised or modified by a third party (including a rogue tester 107). In various implementations, the distributor appliance may collect public keys and other data, such as microprocessor serial numbers, from the devices 106 it is to provision. It may send this information to the provisioning controller 120 and/or the DAMS 110. It may also accept data and commands and other information from the provisioning controller 120 and/or the DAMS 110 to program into the device 106. It may return its own log data and it may return data from the tester 107 to the provisioning controller 120 and/or the DAMS 110.

As shown with respect to the device manufacture 105, the distributor appliance 108 may be communicatively connected to a tester 107, (e.g., a computerized manufacturing apparatus, a product testing device, or the like), which is in turn connects to the device 106*a* that was produced by the manufacturer 105, such as an OBU device. The manufacturer 105 may include or be a factory that manufactures and/or supplies computerized devices 106*a* to the market. As one of many possible examples, the computerized device 106*a* may be an embedded Universal Integrated Circuit Card (eUICC), which is used in cellular modems for telecommunications, incorporated as part of an On Board Unit (OBU) that is later installed in a car, for communications between cars and transportation infrastructure devices. It could also be the V2V secure microprocessor installed in an OBU for communications with other vehicles and Road Side Units (RSU). These newly manufactured devices 106*a* must be properly provisioned with digital assets, for example, digital certificate(s) from the DAMS 110, in order to operate properly. The staff 109 of the manufacturer 105 may use the user portal 115 to interact with the provisioning controller 120 and manage the product provisioning activity by the DAMS 110.

As shown with respect to the installer 130, the distributor appliance 131 may alternatively be communicatively connected directly to the device 106b, while or after the device 106b is installed in its operating environment. The installer 130 may include or be a factory or shop that installs computerized devices 106b into their operating environment—for example, installs OBUs into cars. At installation, the computerized devices 106b must be further properly provisioned with digital assets, for example, additional digital certificate(s) from the DAMS 110, in order to operate properly. The staff 132 of the installer 130 may use the installer user portal 116 to interact with the provisioning controller 120 and manage the product provisioning activity by the DAMS 110.

In various implementations, the provisioning controller 120, the distributor appliances 108, 131, and the DAMS 110 may have secure, non-publicly accessible communications links or channels between them, and in various embodiments, all of the communication links shown in FIG. 1 may be secure, non-publicly accessible communication channels. In various implementations, these secure channels are encrypted and mutually authenticated to prevent unauthorized end points from communicating within this secure infrastructure. Multiple security mechanisms may be used to protect these communications channels so that if the outer layer is somehow compromised, the inner layer will remain secure. As an example, a mutually authenticate TLS tunnel may be used as the outer layer with the inner layer using another protocol such as a proprietary secure communications protocol. These secure connections between the infrastructure components comprising system 100 are used for protecting the sensitive communications between the components and ensuring their correct operation. Using these secure paths, the provisioning controller 120 and the DAMS 110 can send digital data between components without concern that it will be compromised or modified in transit. Command and control information may be also passed over these channels. For instance, the provisioning controller 120 can control to which distributor appliance 108, 131, certain digital assets and data are sent. It can also instruct the distributor appliances 108, 131 how to meter out this data to devices 106 on the manufacturing line that it is provisioning. Further, the distributor appliances 108, 131 can report information back to the provisioning controller 120 without concern that it will be compromised or modified in transit. For example, the secure provisioning controller 120 can program the distributor appliance 108, 131 to provision up to 10,000 devices with any type of digital asset—e.g., certificates, software, fuse contents, etc. The distributor appliance 108, 131 can count the devices it is provisioning and when it reaches its limit, it will report that to the provisioning controller 120. In various implementations, the devices (e.g., 108, 110, 131, 115, 116, 117) that are managed by the provisioning controller 120 include functionality that causes them to cease to operate if they do not regularly communicate with the provisioning controller 120; thus if they are stolen then they become useless. This functionality prevents lost/stolen devices from continuing to operate and to provision devices 106 as if they were still located in the proper manufacturing environment.

Continuing to refer to the example shown in FIG. 1, in operation the distributor appliance 108 located at the manufacturer 105 securely receives digital assets from the DAMS 110 and supplies them to the tester 107 for the device 106a. As each device 106a is manufactured by the manufacturer 105, the tester 107 communicates with the device 106a to get information from the device 106a, such as its unique identification number and status, and to download or otherwise install the digital assets into the device, such as digital certificates. The tester 107 may also supply information (e.g., provisioning status) from the device 106a to the distributor appliance 108, which securely communicates that information to the DAMS 110 and/or the provisioning controller 120. In some implementations, the tester 107 may include a software transportation layer security (TLS) agent that securely transports data between the distributor appliance 108 and the device 106a, which in effect creates a secure encrypted communication path between the DAMS 110 and the device 106a via the distributor appliance 108 and the tester 107, using an ephemeral key associated with each device 106a.

After it is initially provisioned, the manufacturer 105 ships the device 106a to the installer 130, which installs the device 106b. In various implementations, before initial provisioning, the device 106a is nonfunctional; and after initial provisioning by the manufacturer 105, the device 106a is not yet fully functional although it can partially function. In such implementations, the initial provisioning makes the device functional only to the extent needed for installation and further final provisioning, which is required to make it fully operational.

The installer 130 installs the device 106b into its operational environment, and a staff member 132 of the installer 130 notifies the provisioning controller 120 of that fact via the installer portal 116. This notification attests that the installation was properly completed and preferably includes information uniquely identifying the device 106b to the provisioning controller 120. In some implementations, the distributor appliance 131 may automatically notify the provisioning controller 120 after querying the device 106b for status and identification information. In various implementations wherein the installer 130 attests via the Installer portal 116 that he has properly installed the device 106b, this attestation may be logged/saved into the database 125 by the provisioning controller 120. The attestation may include specific test data related to each particular installed device 106b, such as a radio transmit power measurement or a verification of a GPS antenna location.

In response to the installation notification, the provisioning controller 120 verifies that (i) the device 106b is listed in its database 125 as a device that was legitimately manufactured by the manufacturer 105, (ii) the device 106b is listed in its database 125 as having been successfully initially provisioned by the manufacturer 105, and (iii) the installer 130 is listed in its database 125 as an authorized installer. If this verification is successful, the controller 120 directs the DAMS 110 to send the digital assets (e.g., Pseudonym Certificates (PCs)) and/or other information needed to operationally provision the device 106b, such that the device 106b can properly function as installed in its operating environment.

In various implementations, the regulator 140, via the regulator portal 117, interacts with the provisioning controller 120 to identify, verify, and manage installers 130 and/or manufacturers 105, such that unauthorized installers (e.g., hackers) cannot obtain authentic digital assets from the system 100. The staff members of the regulator 140 may be authenticated by the provisioning controller 120 and may have unique IDs with the system 100 so that their actions can be uniquely logged. In various implementations, the regulator 140 can use the regulator portal 117 to query the provisioning controller 120 to obtain copies and reports of information logged by the controller 120, such as attestation reports, installer actions, number and identity of manufactured devices 106a, number and identity of installed, fully provisioned devices 106b, and the like.

In various implementations, the installer 130 must be authenticated as authorized by the provisioning controller 120 in order to interact with the system 100. To become authorized, the installer 130 may, for example, have to execute the appropriate contractual documents stating they will properly install the devices 106b in the target environment (e.g., target vehicle or site or the like). The installer 130 may, for example, be required to attest to other contractual elements by the regulator 140. Preferably, each installer 130 has a unique ID within the system 100 such that their actions can be uniquely logged by the provisioning controller 120.

The described implementations of the system 100 and its functionality ensures that only devices 106 that have been manufactured by the manufacturer 105 and properly installed and tested by and authorized installers 130 are fully provisioned with the digital assets needed to make the devices 106 operational. The provisioning controller 120 produces extensive logs and reports for what actions are taken by whom at each stage in the provisioning process, providing a critical audit capability that has not existed with conventional systems.

One of ordinary skill will recognize that the components, processes, data, operations, and implementation details shown in FIG. 1 are examples presented for conciseness and clarity of explanation. Other components, processes, implementation details, and variations may be used without departing from the principles of the invention, as this example is not intended to be limiting and many variations are possible. For example, although only one manufacturer 105, only one installer 130 and only one regulator 140 are shown in FIG. 1, other implementations may have any number of each of these entities. For another example, although the DAMS 110 and provisioning controller 120 are shown as separate devices, other implementations may combine their functionality into a single device, e.g., a single server. As yet another example, the same may be done for the portals 115-117. For yet another example, the system 100 could additionally include an asset management appliance (AMA, not shown), as described in the incorporated-by-reference U.S. Provisional Application No. 62/421,852 filed on Nov. 14, 2016. In such an implementation, the AMA may be communicatively connected to the provisioning controller 120 and/or the distributor appliances 108, 131 and/or the DAMS 110. In various implementations, the AMA may include a user-friendly GUI and functionality that allows production coordinators to easily and efficiently manage product (e.g. device 106) configurations and builds, and that allows asset owners to easily and efficiently manage inventories of digital assets.

FIG. 2 a swim-lane diagram illustrating an example of process 200 for securely provisioning a computerized device, consistent with implementations of the invention. In various implementations, some or all of the process 200 or the operations shown may be performed by code executing on a general purpose computing system (which may include one or more processors or one or more computing subsystems), by a hardware-only system, or by a system that is a hybrid of the two. As shown across the top of FIG. 2, the entities involved with the process 200 include the manufacturer 105 of the computerized devices 106, the distributor appliance 108 that is located at the manufacturer 105, the provisioning controller 120 and the DAMS 110. In various implementations, these entities may be, and may communicate with each other, as described with respect to FIG. 1 and throughout this disclosure.

As shown in the example of FIG. 2, the process 200 begins at 205 with the manufacturer 105 (e.g., a staff member 109) requesting digital asset provisioning service(s) from the provisioning controller 130, where the digital asset(s) will be provisioned to (e.g., used by) a device 106a and where the request may identify the device 106a that is the destination of the digital asset. The request may be, for example, a manufacturer 105 may be requesting provisioning service for a new product 106 or making a new provisioning service request for an existing product 16. In various implementations, this operation may involve an authorized user logging onto the provisioning controller 130, for example, via the user portal 115. In some cases, the requested digital asset may be a secure credential such as an enrollment certificate; executable code that a device 106 will run; digital operating parameters; or the like. An enrollment certificate is a public key certificate that identifies its holder as an authorized participant in an ecosystem in which all participants must share valid enrollment certificates, (such as the USDOT's V2X ecosystem), and in which authorized participants are able to also receive pseudonym certificates that enable communication and operation of a device 106 within the ecosystem (e.g., to enable communications and operations between vehicles and roadside infrastructure in the example of the USDOT's V2X ecosystem).

At 210, the provisioning controller 120 determines whether the user from the manufacturer 109 is an authorized user. In some implementations, the provisioning controller 120 may also determine at 210 whether the device 106a (e.g., the product) to be provisioned is approved for use with the system 100. In some instances, a list of approved devices may be provided by the regulator 140 of FIG. 1 and used by the provisioning controller 120 to make this determination.

If the user (and/or the product) is not authorized, then the provisioning controller 120 rejects the request for the digital asset provisioning services (not shown in FIG. 2). If, on the other hand, an authorized user is making the request (e.g., for an authorized product) (210, Yes), then the provisioning controller 120 directs, instructs, or otherwise controls the DAMS 110 to fulfill the service request, for instance by transmitting a service request instruction (at 215) to the DAMS 110.

At 220, in response and upon condition of receiving the request from 215, the DAMS 110 configures itself to begin service to the device 106a, based on the request. In some implementations, the DAMS 110 may also send (not shown) instructions to the distributor appliance 108 to configure the distributor appliance 108 to service the device 106a.

At 222, the DAMS 110 generates, creates, calculates, and/or retrieves the digital asset for the device 106a, as requested at 205. In various implementations, the DAMS 110 may create or generate requested digital security asset(s), such as public and private key pairs as well as an enrollment certificate(s) and a pseudonym certificate(s) for the device 106a.

In an alternative implementation (not shown in FIG. 2) of operation 222, the DAMS 110 requests and receives, from the distributor appliance 108, digital-asset-generation information associated with the device 106a, such as enrollment and pseudonym public keys generated by and retrieved from the device 106a and data uniquely identifying the device 106a (e.g., a microprocessor serial number). In such implementations, the DAMS 110 then uses the enrollment and pseudonym public keys to generate the digital asset—e.g., the enrollment certificate and an appropriate number of pseudonym certificates for the device 106a.

At 225, the DAMS 110 transmits the digital asset to the distributor appliance 108 of the manufacturer 105 that requested the digital asset service at 205. For example, the DAMS 110 may securely transmit public and private key pairs, an enrollment certificate and pseudonym certificates to the distributor appliance 108 of the manufacturer 105.

At 226, the DAMS 110 transmits log information regarding the digital asset to the provisioning controller 120. In various implementations, the log information may include information describing the request and transfer of the digital asset, such as the requestor's ID, the digital asset's ID, the distributor appliance's ID, timestamps of the request and transmission actions, the received microprocessor serial number, etc. In some implementations, the log information may include a copy of the digital asset. At 227, the provisioning controller 120 receives and stores the log information, for example in the database 125. The provisioning controller 120, in effect, maintains an audit trail of all the activities that occur in the system 100, which allows many types of data to be assembled, such as data regarding how may devices 106a were built and provisioned by a manufacturer 105 and when. Such data and log information may be used for billing, as well as auditing purposes.

At 230, the distributor appliance 108 receives and stores the digital asset (e.g., public and private key pairs, an enrollment certificate and pseudonym certificates) that was sent by the DAMS 110.

At 235, the distributor appliance 108 requests and receives, from the device 106a, a digital security asset, such as a public key, that can be used to securely transfer the digital asset from the distributor appliance 108 to the device 106a. Various types of devices 106a have the ability to generate an ephemeral key pair, perhaps using a secure processor built into the devices 106, and the public key may be part of the ephemeral key pair. At 240, the distributor appliance 108 uses the digital security asset, (e.g., the public key), to securely transmit the digital asset (e.g., the enrollment certificate) to the device 106a. In various implementations, the distributor appliance 108 may use the device 106a's public key to form, for example, a virtual private network (VPN) with the device 106a and therein securely transmit the digital asset.

In various implementations, the distributor appliance 108 may employ transport layer security (TLS) between it and a tester 107 to secure communications with the tester 107, which may be connected to the device 106a. In implementations where it is desirable to have secure communication directly to the device 106a, the system may create an ephemeral public key pair on the device 106a and, using the public key along with a certificate from the distributor appliance 108 containing the distributor appliance 108's public key, create a secure tunnel to the device 106a. In such implementations, the device 106a would run special code with the system 100's root public key in it to validate the certificate that the distributor appliance 108 sends to it.

Once the secure path is established between the device 106a or the tester 107 and the distributor appliance 108, the device 106a can then create the enrollment and pseudonym public key pairs (e.g., for the V2X ecosystem) and export the public keys and other data to the distributor appliance 108, and the distributor appliance 108 can then send this data to the DAMS 110 and the provisioning controller 120. As described above with respect to the alternative implementation of operation 222, the DAMS 110 may use the received public keys to create the enrollment certificate and the pseudonym certificate(s)—in some implementations, there could be a large number (e.g., 3,000) of the pseudonym certificates. In this alternative example of an implementation, the DAMS 110 will return these certificate(s) to the distributor appliance 108 at operation 225 as previously described. In some other implementations, the DAMS 110 may transmit these certificates to the distributor appliance 131 instead of 108, depending on where the provisioning is being performed.

In some implementations, the distributor appliance 108 may communicate directly with the device 106, for example, if the device 106 has its own wireless or wired communication functionality and is at least partially operational. In other implementations, the distributor appliance 108 may communicate indirectly with the device 106 via an intermediate device, such as a tester 107.

The device 106a receives the digital asset and stores it for use during operation. For example, if the device 106a is an automobile on-board unit (OBU) or electronic control unit (ECU) and the digital asset is a security asset (e.g., a public key certificate) needed to join a wireless network, then the digital security asset is stored by the OBU. When the OBU is later installed and activated in a car, it will attempt to connect to a wireless network. The network will attempt to authenticate the OBU before allowing the OBU to connect to the network. The OBU will be able to authenticate and join the network only if it has the digital security asset provided by the distributor appliance 108 at the manufacturer 105.

At 245, the distributor appliance 108 receives or accesses, from the device 106a, status information that indicates whether or not the device 106a successfully received and installed (e.g., stored) the digital asset that was transmitted at 240.

At 250, the distributor appliance 108 transmits the status information to the provisioning controller 120. And at 255, the provisioning controller 120 receives and stores the status information in association with the log information stored in operation 227. Thus, the provisioning controller 120 continues the audit trail or audit log for all of the system 100 activities associated with each particular device 106. In various implementations, the audit log may contain, for each device 106, information indicating; the success of failure of the manufacturer's provisioning (e.g., operations 235-245); the identity of the digital asset (and/or a copy the digital asset itself); the type of cryptography; and the like.

At 270, if the device 106a was successfully provisioned with the digital asset, then the manufacturer 105 releases the device to the market. For example, the manufacturing company 105 may physically ship the device 106a to a company that installs the device in its operating environment (e.g., the installer company 130 of FIG. 1). In some implementations, the device 106a may be fully programmed or provisioned at this point in time, and able to operate with full functionality; while in other implementations, the device 106a may be only partially programmed or provisioned at this point, and is either unable to operate with full functionality or is nonfunctional.

The example depicted in FIG. 2 is only for the purpose of illustration and is not intended to be limiting. Further, the depicted process 200 is an example that has been somewhat simplified for clarity of explanation of certain novel and innovative features consistent with certain disclosed implementations, but this example is not intended to be limiting and many variations are possible. For example, while the functions and operations are shown as being performed in a particular order, the order described is merely an example, and various different sequences of operations can be performed, consistent with certain disclosed implementations. Moreover, the operations are described as discrete steps merely for the purpose of explanation, and, in some implementations, multiple operations may be performed simultaneously and/or as part of a single computation or larger operation. The operations described are not intended to be exhaustive, limiting, or absolute, and various operations can be modified, inserted, or removed. As an example of a variation, although FIG. 2 is generally described in the context of a single digital asset (e.g., a single digital certificate), the system and process will function similarly to handle multiple digital assets (e.g., two or more digital certificates). For another example, in a case where the device 106a does not have the secure communications ability, the operations 235 and 240 could be removed and the distributor appliance 108 could communicate with the device 106b using unencrypted communications.

For yet another example, in various implementations, the provisioning controller 120, or a delegated authority, such as a specialized signing appliance, may similarly transmit to the distributor appliance 108 and have it load another or an additional digital asset into the device 106b, including digital assets such as software, firmware, fuse blobs, manifest files, etc. In such implementations, the provisioning controller 120 may additionally or alternatively retrieve, obtain, or otherwise access, or direct the accessing of, a requested digital asset from storage. For example (not shown in FIG. 2), the provisioning controller 120, or its authorized delegate, may retrieve an executable software image (e.g., a compiled computer program stored in the database 125) that will be loaded into and run by a device 106a and send the executable software image to the distributor appliance 10 for programming into the device. In various implementations, the digital assets accessed by the provisioning controller 120 may consist only of software, etc., that was securely supplied, released, and/or authorized by the manufacturer 105 of the device 106a, such that no unauthorized software can be loaded into the device 106a. In some implementations, the digital assets retrieved by the provisioning controller 120 may be stored in a storage device or database that is associated with the provisioning controller 120, such as the database 125 of FIG. 1.

FIG. 3 is a swim-lane diagram illustrating an example of process 200 for securely provisioning a computerized device, consistent with implementations of the invention. In various implementations, some or all of the process 300 or the operations shown may be performed by code executing on a general purpose computing system (which may include one or more processors or one or more computing subsystems), by a hardware-only system, or by a system that is a hybrid of the two. As shown across the top of FIG. 3, the entities involved with the process 300 include an installer 130 of the computerized devices 106, the distributor appliance 131 that is located at the installer 130, the provisioning controller 120 and the DAMS 110. In various implementations, these entities may be, and may communicate with each other, as described with respect to FIG. 1 and throughout this disclosure.

As shown in the example of FIG. 3, the process 300 begins at 305 with the installer 130 receiving a device 106b, (for example, an OBU or an ECU), that was manufactured and released or shipped by the manufacturer 105 (see operation 270 of FIG. 2). At 310, the installer 130 may install the device 106b into its operating environment, such as into a larger system. For example, the installer 130 may be an automaker that purchases OBUs from the manufacturer 105, and the installer 130 may install the OBU into a car. In various implementations, installing the device 106b may include testing the operation, functioning, etc. of the device 106b after installation, and collecting related status data.

In some implementations, the device 106b may be only partially provisioned and not fully functional. For example, the manufacturer 105 of the device 106b may have provisioned the device 106b with only the enrollment certificate, such that the device 106b would need to be further provisioned with another digital certification, such a pseudonym certificate in order to gain full functionality, for example, functionality to communicate with another fully programmed device 106.

At 315, the installer 130 (e.g., a staff member 132) transmits installation status data to the provisioning controller 120. In various implementations, the installation status data includes an immutable identifier of the device that was installed, e.g., a serial number or other fixed, uniquely identifying information, such as a public key from a key pair that is generated once and never erased. The installation status data may also include other information, such as a unique identifier of the installer 130, information indicating how and when the device 106b was installed, information about the results of tests done on the installed device 106b, information attesting that the installer 130 installed the device 106b in accordance with applicable specifications, contractual requirements, and or instructions, and/or other similar information.

At 320, the provisioning controller 120 determines whether the user from the installer 130 is an authorized user. If not, then the provisioning controller 120 rejects the installation status communication (not shown in FIG. 3). If, on the other hand, an authorized user is making the request (320, Yes), then the provisioning controller 120 determines (325) whether the device 106b that is identified in the installation status data is an authorized device. In some implementations, the provisioning controller 120 may determine that the device 106b is authorized by verifying against previously stored information its database 125 that 1) there is a record for the device 106b in its dbase 125; 2) the record indicates that the device 106b was successfully provisioned at the manufacturer 105; 3) that the record indicates that the device 106b was sent to the installer 130, (which was verified in 320 as being an authorized installer).

If the device identified in the installation status data is not authorized, then the provisioning controller 120 rejects the installation status communication (not shown in FIG. 3). If, on the other hand, the device 106b identified in the installation status data is authorized (325, Yes), then the provisioning controller 120 stores the installation status data with the log information associated with the device 106b, at 330. For example, the log information associated with the device 106b may have been previously stored in the database 125 as described with respect to operation 227 of FIG. 2.

At 335, the provisioning controller 120 directs, instructs, or otherwise controls the DAMS 110 to fulfill the provisioning request, for instance by transmitting, to the DAMS 110, a request to provision the device 106b, which is at the installer 130. At 340, in response and upon condition of receiving the request from 335, the DAMS 110 generates and/or retrieves the digital asset that was requested at 335. In various implementations, the DAMS 110 may create or generate the requested digital asset, such as a pseudonym certificate or other public key certificate, as described with respect to FIG. 2. In various implementations, the DAMS 110, or the provisioning controller 120 instead of the DAM 110, may additionally or alternatively retrieve, obtain, or otherwise access a requested digital asset from storage, such as an executable image previously stored in the database 125 for use in devices of device 106b's type.

At 345, the DAMS 110 transmits the digital asset to the distributor appliance 131 of the installer 130 that transmitted the installation status at 315. For example, the DAMS 110 may securely transmit a pseudonym certificate to the distributor appliance 131 of the installer 130.

At 350, the distributor appliance 131 performs operations the same as or similar to operations 230-245, as explained about with respect to FIG. 2. At 355, the distributor appliance 131 transmits the status information to the provisioning controller 120. And at 360, the provisioning controller 120 receives and stores the status information in association with previously stored information related to the device 106b, such as status information stored in operation 227. Thus, the provisioning controller 120 continues the audit trail or audit log for all of the system 100 activities associated with each particular device 106.

The process 300 depicted in FIG. 3 is an example for the purpose of illustration and is not intended to be limiting. Further, the depicted process 300 is an example that has been somewhat simplified for clarity of explanation of certain novel and innovative features consistent with certain disclosed implementations, but many variations are possible. For example, while the functions and operations are shown as being performed in a particular order, the order described is merely an example, and various different sequences of operations can be performed, consistent with certain disclosed implementations. Moreover, the operations are described as discrete steps merely for the purpose of explanation, and, in some implementations, multiple operations may be performed simultaneously and/or as part of a single computation or larger operation. The operations described are not intended to be exhaustive, limiting, or absolute, and various operations can be modified, inserted, or removed.

Figure 4A:
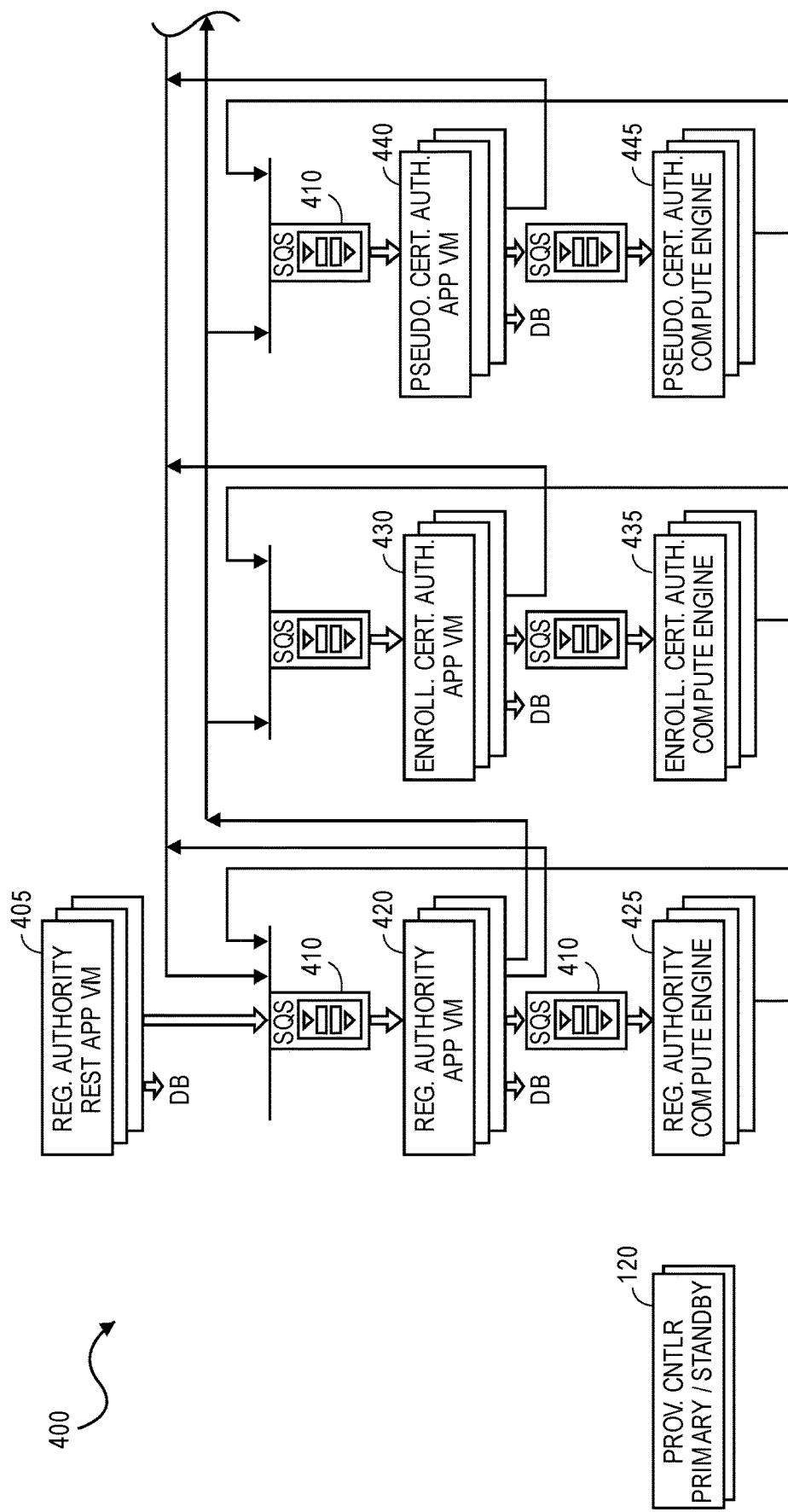
FIG. 4A is the first part of a block diagram of an example of a system for implementing a scalable and secure digital asset management system, consistent with implementations of the invention.
Figure 4B:
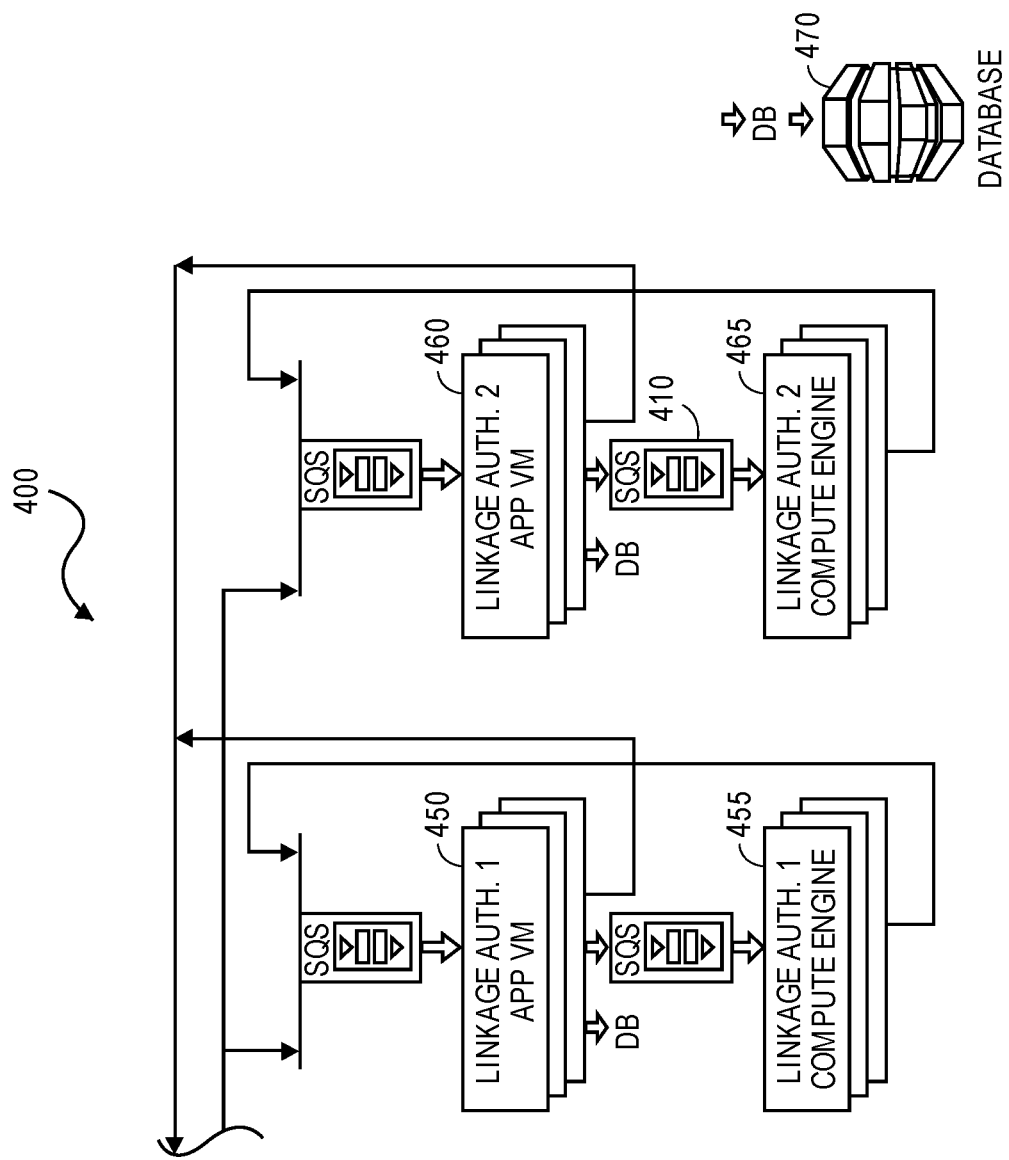
FIG. 4B is the second part of a block diagram of an example of a system for implementing a scalable and secure digital asset management system, consistent with implementations of the invention.

FIGS. 4 A and B are together a a block diagram of an example of a system 400 for implementing a scalable and secure digital asset management system, in accordance with implementations of the invention. Various implementations of the system 400 may be use for extremely high volume device transaction and certificate generation processing. In various implementations, the system 400 may be implemented using multiple servers, hardware security modules, multiple compute or computing engines, and multiple virtual machines (VM). Examples of the system 400 may be implemented in a private data center, a cloud data center such as AWS, or in a hybrid of private and cloud data centers.

In various implementations, the system 400 may be, may be part of, or may interact with, the digital asset management system (DAMS) 110, which may function as described with respect to FIG. 1 and the other sections of this disclosure.

As shown in the example of FIG. 4, the architecture may include two provisioning controllers 120—a primary and a standby, which preferably are implemented in separate servers. The two provisioning controllers 120 include functionality such that objects, data, etc. contained in the primary provisioning controller are copied or otherwise contained in the standby (secondary) provisioning controller. The standby provisioning controller may be brought online to replace the primary provisioning controller if the primary provisioning controller goes offline for any reason. This provides continuous (or very high) availability of the provisioning controllers 120. In various implementations, the primary and a standby provisioning controllers may be as described with respect to FIG. 1 and the other sections of this disclosure. In various implementations, the provisioning controllers 120 may connect to the system 400 in the same or similar manner as described herein with respect to the connections and communication between the provisioning controller 120 and the DAMS 110 of FIG. 1. In general, the provisioning controller 120 manages the system elements comprising the infrastructure so that only explicitly authorized elements can participate and interact with the system 400. In various implementations, the provisioning controller 120 may integrate with a user's (e.g., manufacturer 105 or installer 130) employee identification and authorization system, or it may provide its own capabilities for identification and authorization so that only authorized users can use the system 400.

The architecture of the system 400 separates the non-security-related applications from the security functions. As shown in this example, the registration authority 420, the certificate authorities 430, 440, and the linkage authorities 450, 460 are implemented as applications on their own virtual machines, which execute on their own dedicated compute engines 425, 435, 445, 555, 465, all of which is separate from any non-security-related applications and functions. This provides both a technical and security advantage and improvement over conventional systems, in which the performance of the hardware security modules is slow or in which the cloud service provider cannot supply HSMs or in which their proper management of the HSMs is uncertain. By separating the critical security functions from each other and onto separate compute engines, as shown in FIG. 4, the computation-intensive crypto and security functions (e.g., an elliptic curve butterfly expansion computation or an elliptic curve digital signature), for instance, as performed by the registration authority 420, the certificate authorities 430, 440, and the linkage authorities 450, 460, are performed significantly faster than existing registration authority systems. This design enables significant improvements in transaction processing by enabling the "bottleneck" applications to be scaled as needed. For instance, if the registration authority application running on 405 and 420 needs to scale, additional VMs can be added while no change may be required in the secure compute capability of 425. Alternatively, if the security computations are limiting performance, additional secure compute engines 425 can be added. This same multi-dimensional scaling is true for the other components of 400. This capability provides significant performance improvements over other existing SCMS systems.

In various implementations, the registration authority 405 may be the authority in a provisioning network that verifies user requests for a digital certificate, or other type of digital security asset, and enable a certificate authority, (e.g., the certificate authorities 430, 440) to issue the digital certificate. In various implementations, the registration authority 405 may be similar to the registration authorities known in the public key infrastructure (PKI) system. In various implementations, the registration authority 405 may be implemented as a representational state transfer (REST) web service. As represented by the three "stacked" rectangles shown in FIG. 4 for the registration authority 405, in various implementations there may be multiple instances of the registration authority 405 executing at the same time. This is similarly represented for the other "stacked" elements of FIG. 4.

As represented by the "DB" arrow emerging at the lower left of the rectangles, the registration authority 405 (and the other components of FIG. 4 shown with DB" arrows) may be connected to a database 470. In preferred implementations, the database 470 is a fast access, low-latency database. In some implementations, the database 470 may be a NoSQL database or database service, such as DynamoDB data service offered by Amazon web services. In various implementations, the data stored in the database 410 is application dependent, but may include past issued certificates, various linkage authority values, data on devices to whom certificates have been issued, operator actions, etc. Note that the data may be stored either unencrypted, encrypted or some combination thereof.

In the example shown in FIG. 4, the registration authority 405 is connected to the other components, and the other components are connected to each other, by a messaging subsystem or service, which is represented by the boxes 410. In some implementations, the messaging service 410 may be a fast message queuing service, such as the Amazon simple queue service (SQS) offered by Amazon web services.

In various implementations, the system 400 includes an enrollment certificate authority 430 and a pseudonym certificate authority 440, as the digital certificates produced by the registration authority 405 are split into different segments—e.g., an enrollment digital certificate and pseudonym digital certificate.

In various implementations, the linkage authorities 450, 460 link the identity of the certificate requestor (i.e., a unique identifier of the certificate requestor's device), to the issued pseudonym certificate for revocation purposes.

In various implementations, the compute engines 425, 435, 445, 455, and 465 and the provisioning controller 120 include HSMs, which allow these components to perform secure computations without being unduly threatened from hackers. In some implementations, the compute engines 425, 435, 445, 455, and 465 may be designed to perform secure computations themselves without requiring an embedded HSM—in such implementations, they embody the HSM.

One of ordinary skill will recognize that the components, processes, data, operations, and implementation details shown in FIG. 4 are examples presented for conciseness and clarity of explanation. Other components, processes, implementation details, and variations may be used without departing from the principles of the invention, as this example is not intended to be limiting and many variations are possible.

Figure 5:
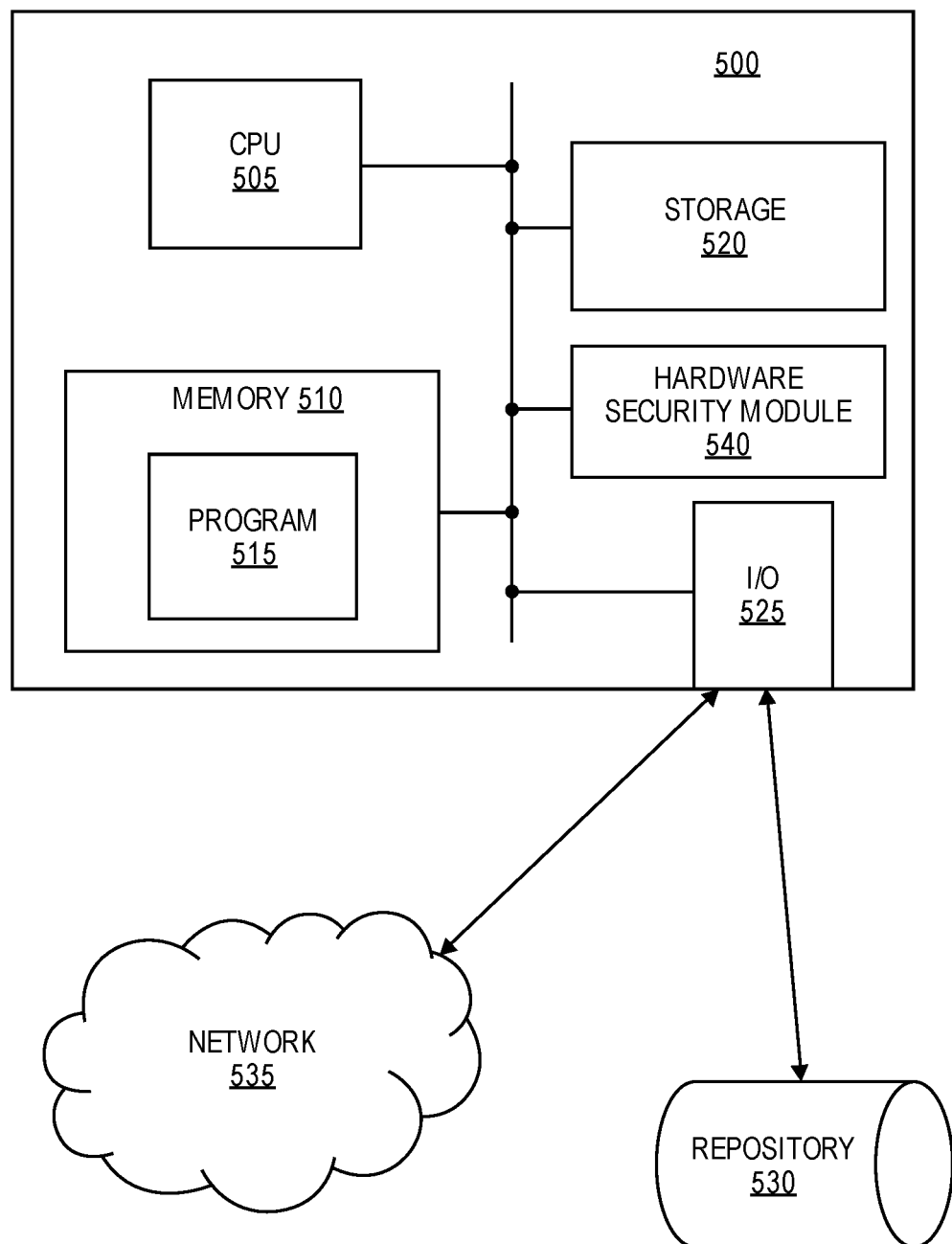
FIG. 5 is a block diagram of an example of a computing system that may be used for hosting systems and methods consistent with implementations of the invention.

FIG. 5 is a block diagram of an example of a computing environment 501, which includes a computing system 500 that may be used for implementing systems and methods consistent with implementations of the invention. Other components and/or arrangements may also be used. In some implementations, computing system 500 may be used to implement, at least partially, various components of FIGS. 1-3, such as the provisioning controller 120 and the DAMS 110, among other things. In some implementations, a series of computing systems similar to computing system 500 may be each customized with specialized hardware and/or programmed as a specialized server to implement one of the components of FIGS. 1-3, which may communicate with each other via a network 535.

In the example shown in FIG. 5, the computing system 500 includes a number of components, such as a central processing unit (CPU) 505, a memory 510, an input/output (I/O) device(s) 525, a hardware security module (HSM) 540, and a nonvolatile storage device 520. System 500 can be implemented in various ways. For example, an implementation as an integrated platform (such as a server, workstation, personal computer, laptop, etc.) may comprise a CPU 505, a memory 510, a nonvolatile storage 520, and I/O devices 525. In such a configuration, the components 505, 510, 520, and 525 may connect and communicate through a local data bus and may access a data repository 530 (implemented, for example, as a separate database system) via an external I/O connection. The I/O component(s) 525 may connect to external devices through a direct communication link (e.g., a hardwired or local wifi connection), through a network, such as a local area network (LAN) or a wide area network (WAN, such as a cellular telephone network or the Internet), and/or through other suitable connections. System 500 may be standalone or it may be a subsystem of a larger system.

The CPU 505 may be one or more known processor or processing devices, such as a microprocessor from the Core™ family manufactured by the Intel™ Corporation of Santa Clara, Calif. or a microprocessor from the Athlon™ family manufactured by the AMD™ Corporation of Sunnyvale, Calif. The memory 510 may be one or more fast storage devices configured to store instructions and information executed or used by the CPU 505 to perform certain functions, methods, and processes related to implementations of the present invention. The storage 520 may be a volatile or non-volatile, magnetic, semiconductor, tape, optical, or other type of storage device or computer-readable medium, including devices such as CDs and DVDs and solid state devices, meant for long-term storage.

In the illustrated implementation, the memory 510 contains one or more programs or applications 515 loaded from the storage 520 or from a remote system (not shown) that, when executed by the CPU 505, perform various operations, procedures, processes, or methods consistent with the present invention. Alternatively, the CPU 505 may execute one or more programs located remotely from the system 500. For example, the system 500 may access one or more remote programs via the network 535 that, when executed, perform functions and processes related to implementations of the present invention.

In one implementation, the memory 510 may include a program(s) 515 for performing the specialized functions and operations described herein for the provisioning controller 120, the DAMS 110, and/or the distributor appliance 108, 131. In some implementations, the memory 510 may also include other programs or applications that implement other methods and processes that provide ancillary functionality to the invention.

The memory 510 may be also be configured with other programs (not shown) unrelated to the invention and/or an operating system (not shown) that performs several functions well known in the art when executed by the CPU 505. By way of example, the operating system may be Microsoft Windows™, Unix™, Linux™, an Apple Computers™ operating system, or other operating system. The choice of operating system, and even to the use of an operating system, is not critical to the invention.

The HSM 540 may be a device with its own processor that securely generates and stores digital security assets and/or securely performs a variety of cryptographic and sensitive computations. The HSM 540 protects digital security assets, such as cryptographic keys, and other sensitive data from possible access by an attacker. In some implementations, the HSM may be a plug-in card or board that attaches directly to the computing system 500.

The I/O device(s) 525 may comprise one or more input/output devices that allow data to be received and/or transmitted by the system 500. For example, the I/O device 525 may include one or more input devices, such as a keyboard, touch screen, mouse, and the like, that enable data to be input from a user. Further, the I/O device 525 may include one or more output devices, such as a display screen, a CRT monitor, an LCD monitor, a plasma display, a printer, speaker devices, and the like, that enable data to be output or presented to a user. The I/O device 525 may also include one or more digital and/or analog communication input/ output devices that allow the computing system 500 to communicate, for example, digitally, with other machines and devices. Other configurations and/or numbers of input and/or output devices may be incorporated in the I/O device 525.

In the implementation shown, the system 500 is connected to a network 535 (such as the Internet, a private network, a virtual private network, a cellular network or other network or combination of these), which may in turn be connected to various systems and computing machines, such as servers, personal computers, laptop computers, client devices, etc. In general, the system 500 may input data from external machines and devices and output data to external machines and devices via the network 535.

In the exemplary implementation shown in FIG. 5, the data source 530 is a standalone database external to system 500, such as the database 125. In other implementations, the data source 530 may be hosted by the system 500. In various implementations, the data source 530 may manage and store data used to implement systems and methods consistent with the invention. For example, the data source 530 may manage and store data structures that contain the status and log information for each device 106 provisioned by the system 100, and the like.

The data source 530 may comprise one or more databases that store information and are accessed and/or managed through the system 500. By way of example, the database 530 may be an Oracle™ database, a Sybase™ database, or other relational database. Systems and methods consistent with the invention, however, are not limited to separate data structures or databases, or even to the use of a database or data structure.

One of ordinary skill will recognize that the components and implementation details of the system in FIG. 5 are examples presented for conciseness and clarity of explanation. Other components and implementation details may be used.

Although the foregoing examples use specific examples of computerized devices, such a OBUs, ECUs, and RSUs for clarity of explanation, the invention is not limited to those specific examples. Various implementations consistent with the invention may be used with and for a wide variety of computerized devices, such as medical device (e.g., dialysis machines, infusion pumps, etc.); robots; drones; autonomous vehicles; and wireless communication modules (e.g., embedded Universal Integrated Circuit Cards (eUICC)), among others.

Other implementations of the invention will be apparent to those skilled in the art from consideration of the specification and practice of the invention disclosed herein. It is intended that the specification and examples be considered as exemplary only, with a true scope of the invention being indicated by the claims below.

What is claimed is:

1. A system for securely provisioning a computerized device, the system comprising:
   a secure distributor computer that is communicatively connected to the computerized device, and that receives a first digital asset and transmits the first digital asset to the computerized device; and
   a digital asset management server that is connected to the secure distributor computer, and that transmits the first digital asset to the secure distributor computer when a first authorizing condition is met, wherein the first digital asset is configured to cause the computerized device to become partially provisioned;
   wherein the digital asset management server transmits a second digital asset to the computerized device; and
   wherein the computerized device is functional after the second digital asset is transmitted to the computerized device.

2. The system according to claim 1, wherein the first authorizing condition is that the computerized device is approved for use with the system.

3. The system according to claim 2, wherein the system determines whether the computerized device is approved for use with the system by consulting a stored list of approved computerized devices.

4. The system according to claim 1, wherein the first authorizing condition is that a user of the secure distributor computer is an authorized user.

5. The system according to claim 1, wherein the system stores log information regarding the first digital asset.

6. The system according to claim 5, wherein the log information includes at least one of: an identification of a user of the secure distributor computer, an identification of the first digital asset, and a timestamp of a request for the first digital asset.

7. The system according to claim 1, wherein the digital asset management server transmits the second digital asset to the computerized device when a second authorizing condition is met.

8. The system according to claim 7, wherein the second authorizing condition is a determination that the computerized device is an authorized computerized device.

9. The system according to claim 1, wherein the system stores log information regarding the second digital asset.

10. A method for provisioning a computerized device, the method comprising:
    transmitting, by a digital asset management server, a first digital asset to a secure distributor computer when a first authorizing condition is determined to be met;
    transmitting, by the secure distributor computer, the first digital asset to the computerized device, wherein the first digital asset is configured to cause the computerized device to become partially provisioned;
    receiving, by the digital asset management server, an instruction to transmit a second digital asset to the computerized device;
    in response to the instruction, transmitting, by the digital asset management server, the second digital asset to the computerized device;
    wherein the second digital asset is configured to cause the computerized device to become functional; and
    wherein the secure distributor computer is connected to the computerized device and the digital asset management server is connected to the secure distributor computer.

11. The method of claim 10, wherein the first authorizing condition is that the computerized device is approved for use.

12. The method of claim 11, wherein the computerized device is approved for use when it is determined that the computerized device is on a stored list of approved computerized devices.

13. The method according to claim 10, wherein the first authorizing condition is met when it is determined that a user of the first secure distributor computer is an authorized user.

14. The method according to claim 10, further comprising:
storing log information regarding the first digital asset.

15. The method according to claim 14, wherein the log information includes at least one of an identification of a user of the secure distributor computer, an identification of the first digital asset, and a timestamp of a request for the first digital asset.

16. The method according to claim 10, wherein transmitting the second digital asset to the computerized device comprises transmitting the second digital asset to the computerized device when a second authorizing condition is met.

17. The method according to claim 16, wherein the second authorizing condition is a determination that the computerized device is an authorized computerized device.

18. The method according to claim 10, further comprising storing log information regarding the second digital asset.

19. A system for securely provisioning a computerized device, the system comprising:
a distributor computer that is communicatively connected to the computerized device, and that receives a first digital asset and transmits the first digital asset to the computerized device; and
a server that is connected to the secure distributor computer, and that transmits the first digital asset to the distributor computer when a first authorizing condition is met, wherein the first digital asset is configured to cause the computerized device to become partially provisioned;
wherein the server transmits a second digital asset to the computerized device; and
wherein the computerized device is functional after the second digital asset is transmitted to the computerized device.

20. The system according to claim 19, wherein the first authorizing condition is that the computerized device is approved for use with the system.

21. The system according to claim 20, wherein the system determines whether the computerized device is approved for use with the system by consulting a stored list of approved computerized devices.

22. The system according to claim 19, wherein the first authorizing condition is that a user of the distributor computer is an authorized user.

23. The system according to claim 19, wherein the system stores log information regarding the first digital asset.

24. The system according to claim 23, wherein the log information includes at least one of: an identification of a user of the distributor computer, an identification of the first digital asset, and a timestamp of a request for the first digital asset.

25. The system according to claim 19, wherein the server transmits the second digital asset to the computerized device when a second authorizing condition is met.

26. The system according to claim 25, wherein the second authorizing condition is a determination that the computerized device is an authorized computerized device.

27. The system according to claim 19, wherein the system stores log information regarding the second digital asset.

28. A method for provisioning a computerized device, the method comprising:
transmitting, by a server, a first digital asset to a distributor computer when a first authorizing condition is determined to be met;
transmitting, by the distributor computer, the first digital asset to the computerized device, wherein the first digital asset is configured to cause the computerized device to become partially provisioned;
receiving, by the server, an instruction to transmit a second digital asset to the computerized device;
in response to the instruction, transmitting, by the server, the second digital asset to the computerized device;
wherein the second digital asset is configured to cause the computerized device to become functional; and
wherein the distributor computer is connected to the computerized device and the server is connected to the distributor computer.

29. The method of claim 28, wherein the first authorizing condition is that the computerized device is approved for use.

30. The method of claim 29, wherein the computerized device is approved for use when it is determined that the computerized device is on a stored list of approved computerized devices.

* * * * *